United States Patent
Heide et al.

(10) Patent No.: US 6,710,141 B1
(45) Date of Patent: Mar. 23, 2004

(54) METHOD FOR CONTINUOUSLY PRODUCING CROSS-LINKED FINE-PARTICLE GELEOUS POLYMERIZATES

(75) Inventors: Wilfried Heide, Freinsheim (DE); Stefan Wickel, Bissersheim (DE); Thomas Daniel, Waldsee (DE); Joachim Nilges, Ludwigshafen (DE); Jürgen Hofmann, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 8 days.

(21) Appl. No.: 10/111,428

(22) PCT Filed: Nov. 10, 2000

(86) PCT No.: PCT/EP00/11098

§ 371 (c)(1),
(2), (4) Date: May 8, 2002

(87) PCT Pub. No.: WO01/38402

PCT Pub. Date: May 31, 2001

(30) Foreign Application Priority Data

Nov. 20, 1999 (DE) .......................................... 199 55 861

(51) Int. Cl.$^7$ .............................. C08F 2/10; C08F 2/01; B01J 19/20; B01J 14/00
(52) U.S. Cl. .................... 526/88; 524/832; 526/303; 526/317
(58) Field of Search .................... 526/88, 303, 317; 524/832

(56) References Cited

U.S. PATENT DOCUMENTS 4,625,001 A * 11/1986 Tsubakimoto et al. ........ 526/88
4,920,202 A * 4/1990 Irie et al. .................... 528/500

FOREIGN PATENT DOCUMENTS

| DE | 34 32 690 | 3/1985 |
| DE | 197 10 212 | 9/1998 |
| EP | 0 223 063 | 5/1987 |
| GB | 2 177 410 | 1/1987 |

* cited by examiner

Primary Examiner—Kelechi C. Egwim
(74) Attorney, Agent, or Firm—Oblon, Spivak, McClelland, Maier & Neustadt, P.C.

(57) ABSTRACT

A process for continuous production of crosslinked fine particles of polymer gel by copolymerizing a) water-soluble monoethylenically unsaturated monomers, b) from 0.001 to 5 mol % based on the monomers (a) of monomers containing at least two ethylenically unsaturated double bonds, and c) from 0 to 20 mol % based on the monomers (a) of water-insoluble monoethylenically unsaturated monomers in from 20 to 80% by weight aqueous solution in the presence of an initiator at from 0 to 140° C. by feeding the aqueous solution of the monomers together with the initiator and an inert gas continuously into a mixing kneader having at least two axially parallel rotating shafts equipped with a plurality of kneading and transporting elements which convey the substances introduced at the upstream end of the mixing kneader in the axial direction toward the downstream end of the mixer, comprises the fraction of heat being removed by evaporation of water from the reaction mixture being not less than 5% of the heat of reaction and the fraction of heat being removed by product discharge being not less than 25% of the heat of reaction and the rest of the heat being removed via cooling of the reactor walls.

20 Claims, No Drawings

METHOD FOR CONTINUOUSLY PRODUCING CROSS-LINKED FINE-PARTICLE GELEOUS POLYMERIZATES

The present invention relates to a process for continuous production of crosslinked fine particles of polymer gel.

DE-A-34 32 690 discloses a process for continuous production of crosslinked polymers by polymerizing water-soluble monomers in the presence of a crosslinker and of initiators in a vessel provided with a plurality of parallel rotary stirrer shafts fitted with stirrer blades. The polymerization is carried out continuously in a two-arm kneader or, for example, in a three-shaft kneader. This type of reactor gives rise to pronounced backmixing, so that the monomer solution is applied to the finely divided water-containing gel polymer and the polymerization of the monomer takes place on the surface of the polymer gel. The finely divided polymer gels producible in this way have a relatively high residual monomer content.

EP-A-223 063 teaches a process for continuous production of crosslinked fine particles of polymer gel in a single-screw cylindrical mixer whose mixing segments cause the substances to be conveyed from the upstream to the downstream end of the cylindrical mixer. The polymerization is carried out at from 100 to 800 mbar, so special equipment is needed to regulate the pressure. The monomers have to be metered into the reactor via a pressure maintenance valve, which tends to get clogged up with polymer. In addition, the two processes have an unsatisfactorily broad residence time spectrum and a fluctuating product discharge.

It is an object of the present invention to provide a high space-time yield process which is convenient in terms of equipment and whose product is a uniform polymer gel having a low residual monomer content.

We have found that this object is achieved by a process for continuous production of crosslinked fine particles of polymer gel by copolymerizing
a) water-soluble monoethylenically unsaturated monomers,
b) from 0.001 to mol % based on the monomers (a) of monomers containing at least two ethylenically unsaturated double bonds, and
c) from 0 to 20 mol % based on the monomers (a) of water-insoluble monoethylenically unsaturated monomers in from 20 to 80% by weight aqueous solution in the presence of an initiator at from 0 to 140° C. by feeding the aqueous solution of the monomers together with the initiator and an inert gas continuously into a mixing kneader having at least two axially parallel rotating shafts equipped with a plurality of kneading and transporting elements which convey the substances introduced at the upstream end of the mixing kneader in the axial direction toward the downstream end of the mixer, which comprises the fraction of heat being removed by evaporation of water from the reaction mixture being not less than 5% of the heat of reaction and the fraction of heat being removed by product discharge being not less than 25% of the heat of reaction and the rest of the heat being removed via cooling of the reactor walls.

Water-soluble monoethylenically unsaturated monomers of group (a) include for example ethylenically unsaturated $C_3$- to $C_6$-carboxylic acids, amides and esters with aminoalcohols of the formula

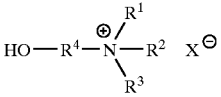

where $R^4$ is $C_2$ to $C_5$-alkylene and $R^1$, $R^2$, $R^3$ are independently hydrogen, methyl, ethyl or propyl. These compounds include for example acrylic acid, methacrylic acid, crotonic acid, itaconic acid, maleic acid, fumaric acid, the alkali metal and ammonium salts of these acids, acrylamide, methacrylamide, crotonamide, dimethylaminoethyl acrylate, diethylaminoethyl acrylate, dimethylaminopropyl acrylate, dimethylaminobutyl acrylate, diethylaminoethyl methacrylate, dimethylaminoethyl methacrylate, dimethylaminopropyl methacrylate, dimethylaminoneopentyl acrylate and dimethylaminoneopentyl methacrylate. The basic acrylates and methacrylates are used in the form of the salts with strong mineral acids, sulfonic acids or carboxylic acids or in quaternized form. The anion $X^-$ for the compounds of the formula I is the acid radical of the mineral acids or of the carboxylic acids or methosulfate, ethosulfate or halide from a quaternizing agent.

Further water-soluble monomers of group (a) are N-vinylpyrrolidone, acrylamidopropanesulfonic acid, vinylphosphonic acid and alkali metal and ammonium salts of vinylsulfonic acid. The other acids may likewise be used in the polymerization either in non-neutralized form or in partially or up to 100% neutralized form. Useful water-soluble monomers of group (a) also include diallylammonium compounds, such as dimethyldiallylammonium chloride, diethyldiallylammonium chloride or diallylpiperidinium bromide, N-vinylimidazolium compounds, such as salts or quaternization products of N-vinylimidazole and 1-vinyl-2-methylimidazole, and N-vinylimidazolines, such as N-vinylimidazoline, 1-vinyl-2-methylimidazoline, 1-vinyl-2-ethylimidazoline or 1-vinyl-2-n-propylimidazoline, which are likewise used in the polymerization in quaternized form or as salt.

Preferred monomers of group (a) are acrylic acid, methacrylic acid, the alkali metal and ammonium salts of these acids, acrylamide and methacrylamide. These monomers may be copolymerized with each other in any desired proportion.

The monomers of group (a) are polymerized in the presence of crosslinkers (monomers of group (b)). Said crosslinkers contain at least two ethylenically unsaturated double bonds. Useful crosslinkers include for example N,N'-methylenebisacrylamide, polyethylene glycol diacrylates and polyethylene glycol dimethacrylates which are each derived from polyethylene glycols having a molecular weight of from 126 to 8500, preferably from 400 to 2000, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, doubly or triply acrylated or methacrylated polyhydric alcohols, such as glycerol or pentaerythritol, triallylamine, tetraallylethylenediamine, divinylbenzene, diallyl phthalate, polyethylene glycol divinyl ether of polyethylene glycols having a molecular weight of from 126 to 4000, trimethylolpropane. diallyl ether, butanediol divinyl ether, pentaerythritol triallyl ether and/or divinylethyleneurea. Preference is given to using water-soluble crosslinkers, for example N,N-methylenebisacrylamide, polyethylene glycol diacrylate, polyethylene glycol dimethacrylates, pentaerythritol triallyl ether and/or divinylurea. The monomers of group (b) are used in the copolymerization in amounts from 0.001 to 5, preferably from 0.005 to 0.5, mol % based on the monomers (a).

The copolymerization of the monomers of groups (a) and (b) may—if a change in the properties of the copolymers is desired—be carried out in the additional presence of monomers of group (c). Useful monomers of group (c) include for example hydroxyethyl acrylate, hydroxypropyl acrylate, hydroxyethyl methacrylate, hydroxypropyl methacrylate, acrylonitrile and methacrylonitrile.

Also useful are esters of acrylic acid or methacrylic acid with monohydric alcohols containing from 1 to 18 carbon atoms, eg methyl acrylate, ethyl acrylate, propyl acrylate, isopropyl acrylate, n-butyl acrylate, isobutyl acrylate, hexyl acrylate, 2-ethylhexyl acrylate, stearyl acrylate, the corresponding esters of methacrylic acid, diethyl fumarate, diethyl maleate, dimethyl maleate, dibutyl maleate, vinyl acetate and vinyl propionate. If the monomers of group (c) are used for modifying the water-soluble polymers, from 0.5 to 20, preferably from 2 to 10, mol % based on monomers (a) are used.

The water-insoluble monomers, if used in the copolymerization, may be finely dispersed in the aqueous solution by means of emulsifiers. Useful emulsifiers include for example ethoxylated nonylphenols, ethoxylated castor oil, alkyl sulfates, sorbitan fatty esters, ethoxylated sorbitols, ethoxylated sorbitan fatty esters and alkylsulfonates. The emulsifiers are used in an amount of from 0 to 3% by weight based on the monomers (a).

The polymerization may be carried out in the presence of customary polymerization regulators. Useful polymerization regulators include for example thio compounds, such as thioglycolic acid, mercaptoalcohols, eg 2-mercaptoethanol, mercaptopropanol and mercaptobutanol, dodecyl mercaptan, formic acid, ammonia and amines, eg ethanolamine, diethanolamine, triethanolamine, triethylamine, morpholine and piperidine.

The monomers (a), (b) and optionally (c) are copolymerized with each other in from 20 to 80%, preferably from 20 to 50%, especially from 30 to 45%, by weight aqueous solution in the presence of polymerization initiators. Useful polymerization initiators include all comppunds which decompose into free radicals under the polymerization conditions, for example peroxides, hydroperoxides, hydrogen peroxide, persulfates, azo compounds and redox catalysts. Preference is given to using water-soluble catalsyts. In some cases it is advantageous to use mixtures of various polymerization initiators, for example mixtures of hydrogen peroxide and sodium peroxodisulfate or potassium peroxodisulfate. Mixtures of hydrogen peroxide and sodium peroxodisulfate may be used in any proportion. Useful organic peroxides include for example acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, tert-butyl per-3,5,5-tri-methylhexanoate and tert-amyl perneodecanoate. Useful polymerization initiators further include azo initiators, eg 2,2'-azobis(2-amidinopropane) dihydrochloride, 2,2'-azobis-(N,N-dimethylene)isobutyramidine dihydrochloride, 2-(carbamoylazo)isobutyronitrile and 4,4'-azobis-(4-cyanovaleric acid). The polymerization initiators mentioned are used in customary amounts, for example in amounts from 0.01 to 5, preferably from 0.1 to 2, mol %, based on the monomers to be polymerized.

In redox catalysts, the oxidizing component is at least one of the above-specified per compounds and the reducing component is for example ascorbic acid, glucose, sorbose, ammonium or alkali metal bisulfite, sulfite, thiosulfate, hyposulfite, pyrosulfite or sulfide, or metal salts, such as iron(II) ions or silver ions or sodium hydroxymethylsulfoxylate. The reducing component in the redox catalyst is preferably ascorbic acid or sodium pyrosulfite. Based on the amount of monomers used in the polymerization, from $1 \cdot 10^{-5}$ to 1 mol % is used of the reducing component of the redox catalyst system and from $1 \cdot 10^{-5}$ to 5 mol % of the oxidizing component of the redox catalyst. Instead of or in addition to the oxidizing component of the redox catalyst it is also possible to use one or more water-soluble azo initiators.

The process of the invention is preferably carried out using a redox system of hydrogen peroxide, sodium peroxodisulfate and ascorbic acid. In a customary embodiment, these components are used in the concentrations of $1 \cdot 10^{-2}$ mol % hydrogen peroxide, 0.084 mol % sodium peroxodisulfate and $2.5 \cdot 10^{-3}$ mol % ascorbic acid based on the monomers.

The aqueous monomer solution may contain the initiator in solution or dispersion. However, the initiators may also be fed into the mixing kneader separately from the monomer solution.

Prior to polymerization, the monomer solution is freed of residual oxygen. This is accomplished by means of inert gas, which may be introduced in cocurrent, in countercurrent or at entry angles in between. Good mixing may be obtained for example using nozzles, static or dynamic mixers or bubble columns.

The monomer solution is likewise passed through the reactor together with an inert gas stream. The mass throughput in terms of monomer solution is preferably not less than 1000, particularly preferably not less than 2000, especially not less than 3000, kg/hm$^3$ (reactor volume) and the inert gas flow is preferably not less than 100 l/hm$^3$ (reactor volume).

The inert gases used may be independently nitrogen, a noble gas such as argon, carbon monoxide, carbon dioxide, sulfur hexafluoride or a mixture thereof. The inert gas may be wholly or partly generated by a chemical reaction in the mixing kneader. The preferred inert gas is nitrogen.

The reactor volume may vary according to the conversion desired. The reactor volume is preferably not less than 0.1 m$^3$, particularly preferably from 0.2 to m$^3$, especially from 0.2 to 12 m$^3$.

At the point of addition of the monomers into the mixer the substances are liquid, but the consistency of the reaction mixture changes via a highly viscous state into a crumbly gel which is discharged at the downstream end of the mixer by the continuous conveying action of the mixer. The polymerization produces a gel which the mixer comminutes into a finely divided, crumbly gel and which is then discharged in that state. An important requirement in this context is that some of the water is removed during the polymerization in the mixer, so that the crumbly gel particles obtained at the downstream end of the mixer have a solids content of from 20 to 100% by-weight.

Mixing kneaders useful in the process of the invention are obtainable from List and are described for example in CH-A-664 704, EP-A-517 068, WO 97/12666, DE-A-21 23 956, EP-A-603 525, DE-A-195 36 944 and DE-A-4 118 884.

Such kneaders with 2 shafts have such an arrangement for the kneading and transporting elements that a high self-cleaning effect is obtained, and this high self-cleaning effect is an important requirement for a continuous polymerization. The two. shafts preferably contrarotate.

The stirring shaft is fitted with disk segments in propeller fashion. Useful kneading and transporting elements include for example close-clearance mixing bars and L- or U-shaped attachments.

The mixing kneader may be heated or cooled as required. The monomer solution is polymerized therein at from 0 to 140° C. under atmospheric pressure. The temperature is preferably from 20 to 120° C., especially from 40 to 120° C. The maximum temperature in a preferred version of the process is not less than 70° C., particularly preferably not less than 80° C., especially not less than 90° C., the exit gas temperature not less than 60° C., particularly preferably not less than 80° C., especially not less than 90° C., and the product temperature at the point of discharge from the reactor not less than 60° C., particularly preferably not less than 75° C., especially not less than 85° C.

The process of the invention is preferably carried out in such a way that the fraction of heat removed by evaporation of water from the reaction mixture is not less than 15%, particularly preferably not less than 25%, of the heat of reaction.

Preference is further given to process variants where the fraction of heat removed by product discharge is not less than 45%, especially not less than 55%, of the heat of reaction.

Preference is given to processes wherein in total not less than 50%, particularly preferably not less than 70%, especially not less than 90%, of the heat of reaction is removed by product discharge and water evaporation.

In a very particularly preferred process variant, no heat is removed via the cooling of the reactor walls.

The gel obtained in the polymerization has a water content of from 0 to 80% by weight, preferably from 40 to 70% by weight. This relatively low moisture content of an already free-flowing gel which does not clump reduces the energy subsequently required for drying.

The production process is notable for short residence times in the reactor and hence for a good space-time yield. Even residence times of below 30 minutes in a reactor volume of 300 l gives fine particles of polymer gel having a very low residual monomer content. This does away with the need for the otherwise necessary separation processes and increases the yield. Particular preference is given to process variants involving a high mass throughput which permits residence times of below 20 minutes and even below 10 minutes.

The polymer gel leaving the reactor is subsequently stored in a delay vessel at from 50 to 120° C., preferably at from 80 to 100° C. The delay time is generally from 0 to 3 hours, preferably from 5 to 30 minutes. The vessel can be open at the top, but it is also possible to use a closed vessel to which a slight vacuum is applied.

The drying step can be carried out according to all known processes, for example in a fluidized bed, on a through circulation drying belt, on a vacuum drying belt or with the aid of microwave drying, or preferably under reduced pressure in a single-screw kneader with intensive kneading of the polymer gel. This drying step is preferably carried out in a single- or multi-screw kneader at from 30 to 300, preferably from 20 to 70, mbar and at from 30 to 170° C. Drying affords a free-flowing polymer gel which is very water-absorbent and useful as soil conditioner or as absorbent in hygiene articles, for example diapers. In the Examples, parts and percentages are by weight.

Description of Test Methods

Centrifuge Retention Capacity CRC:

CRC was determined by weighing 0.2 g of hydrogel-forming polymer (particle size 106–850 $\mu$m) into a teabag 60×85 mm in size, which was subsequently sealed. The teabag was then placed in an excess of 0.9% by weight sodium chloride solution (at least 0.83 l of sodium chloride solution/1 g of hydrogel-forming polymer). After a swell time of 30 minutes, the teabag was removed from the sodium chloride solution and centrifuged at 250 G for three minutes. The centrifuged bag was weighed to determine the amount of fluid retained by the hydrogel-forming polymer.

Absorption Under Load AUL 0.7 psi (4826.5 Pa)

The measuring cell for determining the AUL 0.7 psi (4826.5 Pa) is a Plexiglas cylinder 60 mm in internal diameter and 50 mm in height. Adhesively attached to its underside is a stainless steel sieve bottom having a mesh size of 36 $\mu$m. The measuring cell further includes a plastic plate 59 mm in diameter and a weight which can be placed in the measuring cell together with the plastic plate. The weight of the plastic plate and of the weight totals 1345 g. AUL 0.7 psi (4826.5 Pa) is determined by measuring the weight of the empty Plexiglas cylinder and of the plastic plate and recording it as $W_o$. Then 0.900±0.005 g of hydrogel-forming polymer (particle size distribution: 150–800 $\mu$m) is weighed into the Plexiglas cylinder and distributed very uniformly over the stainless steel sieve bottom. The Plexiglas plate is then carefully placed in the Plexiglas cylinder, the entire unit is weighed and the weight is recorded as $W_a$. Then the weight is placed on the plastic plate in the Plexiglas cylinder. A ceramic filter plate 120 mm in diameter and 0 in porosity is placed in the center of a Petri dish 200 mm in diameter and 30 mm in height and sufficient 0.9% by weight sodium chloride solution is introduced for the surface of the liquid to be level with the filter plate surface without the surface of the filter plate being covered. Then a round filter paper 90 mm in diameter and <20 $\mu$m in pore size (Schwarzband 589 from Schleicher & Schüll) is placed on the ceramic filter plate. The Plexiglas cylinder containing hydrogel-forming polymer is then placed together with the plastic plate and weight on top of the filter paper and left there for 60 minutes. At the end of this period, the complete unit is removed from the filter paper and the Petri dish and subsequently the weight is removed from the Plexiglas cylinder. The Plexiglas cylinder containing swollen hydrogel is weighed together with the plastic plate and the weight is recorded as $W_b$. AUL 0.7 psi (4826.5 Pa) is calculated according to the following equation:

$$\text{AUL } 0.7 \text{ psi} = [W_b - W_a]/[W_a - W_o]$$

The Examples which follow illustrate the invention.

EXAMPLE 1

Not According to Invention

Composition of the Reaction Solution Used:

40% by weight of acrylic acid monomer and sodium acrylate monomer having a degree of neutralization of 77 mol % for the acrylic acid. Acrylic acid was neutralized (specification: not less than 99.5% by weight of acrylic acid, not more than 0.1% by weight of water, not more than 500 ppm of diacrylic acid, 180–200 ppm of monomethyl hydroquinone ether, <2000 ppm of acetic acid, <600 ppm of propionic acid). After neutralization, the mixture was stored for not more than 6 hours before it was used for polymerization. The free-radical polymerization was initiated using the following system: 0.005% by weight of hydrogen peroxide and 0.006% by weight of ascorbic acid and 0.28% by weight of sodium peroxodisulfate, all the percentages being based on the monomers—expressed as acrylic acid—present in the reaction solution. The polyethylenically unsaturated crosslinker used was polyethylene glycol 400 diacrylate (Cray Valley) in an amount of 0.45% by weight based on the monomers—expressed as acrylic acid—present in the reaction solution. The crosslinker was mixed together with the aqueous monomer solution and this solution was inertized by passing nitrogen through it.

The individual components of this reaction solution (dilute aqueous solutions of hydrogen peroxide, ascorbic acid, sodium peroxodisulfate and the monomer/crosslinker solution) were metered separately into the kneading reactor and mixed therein in the course of the addition into the reactor, and the polymerization started speedily even in the course of the mixing.

600 kg/h of reaction solution were introduced into a List ORP 250 Contikneader (from List, Arisdorf, Switzerland) and the gel produced by polymerization in the kneader was continuously discharged. The temperature of the cooling water in the jacket was 40° C. at a total cooling water throughput through the jacket of 12 m$^3$/h. During the polymerization, 14 m$^3$/h of nitrogen inert gas were passed through this kneader. The reaction volume was 300 l.

The reactor was operated in such a way that 62% of the heat of reaction was removed by the jacket cooling of the reactor wall and 38% by discharge of the hot product gel. Under these conditions, no heat was removed through water evaporation.

The reaction solution has a temperature of 23.5° C. on addition and the product gel had a temperature of 64.5° C. at the point of discharge. Maximum product temperatures <80° C. were measured in the reactor. The residence time of the product in the reactor was less than 15 min.

The product gel obtained was analyzed and found to have a residual acrylic acid content of 1.23% by weight and a solids content of 41.0% by weight. The gel was dried, ground and sieved to a particle size fraction of 100–800 μm. The dried polymer had a centrifuge retention capacity of 38.8 g/g. The pH of the polymer was 6.1.

Surface Postcrosslinking:

A Waring lab mixer with mixing attachment and blunted mixing blades was then charged with 20 g of polymer (particle size fraction 100–800 μm). While the mixer was turning at slow speed, 1 g of postcrosslinking solution containing 12 mg of ethylene glycol diglycidyl ether dissolved in a mixture of 33% by weight of 1,2-propylene glycol and 67% by weight of water was metered in. The moist polymer powder was subsequently removed from the mixer and dried in a Petri dish in a through-circulation cabinet at 150° C. for 60 minutes. After the coarse fraction (>800 micrometers) had been sieved off, the product obtained was tested for its application characteristics:

Centrifuge retention capacity, CRC=32.2 g/g
AUL 0.7 psi: 26.0 g/g.

EXAMPLE 2

600 kg/h of reaction solution were continuously polymerized as described in Example 1 except that the temperature of the cooling water in the reactor jacket was controlled to 90° C. and the coolant flow rate was reduced to about 6 m$^3$/h. The reactor was operated in such a way that 64% of the heat of reaction were removed via the product discharge and 36% via the evaporation of the water of reaction. Reaction temperatures of 96–98° C. were found in the reactor. The residence time in the reactor was less than 15 minutes. No heat was removed via the reactor wall. 0.25% by weight of residual acrylic acid monomer was found in the product gel which had a solids content of 43.0% by weight. The reactor inlet temperature in the reaction solution was 23.2° C. and the reactor exit temperature of the product gel obtained was 93.2° C.

The gel obtained was dried, ground, sieved and surface-postcrosslinked similarly to Example 1. The application testing results are shown in Table 1. The dried polymer had a centrifuge retention capacity of 37.8 g/g and a pH of 6.1 prior to the surface postcrosslinking.

EXAMPLE 3

Example 2 was repeated except that only 450 kg/h of reaction solution were introduced into the reactor instead of 600 kg/h. The residence time in the reactor was now about 20 min.

The residual monomer content of the product gel, which had a solids content of 43.1% by weight, was found to be 0.15% by weight. The reactor inlet temperature of the reaction solution was 23.4° C. and the reactor exit temperature of the product gel obtained was 91.7° C. Maximum reaction temperatures of 95–97° C. were measured in the reactor.

The gel obtained was dried, ground, sieved and surface-postcrosslinked similarly to Example 1. The application testing results are shown in Table 2. The dried polymer had a centrifuge retention capacity of 39.5 g/g and a pH of 6.1 prior to the surface postcrosslinking.

EXAMPLE 4

Example 2 was repeated.

It was found that the residual monomer content of the product gel was 0.30% by weight, while the solids content was 42.9% by weight. The reactor inlet temperature of the reaction solution was 23.4° C., and the reactor exit temperature of the product gel obtained was 93.2° C.

The gel obtained was dried, ground, sieved and surface-postcrosslinked similarly to Example 1. The application testing results are shown in Table 2. The dried polymer had a centrifuge retention capacity of 39.4 g/g and a pH of 6.1 prior to the surface postcrosslinking.

EXAMPLE 5

Example 2 was repeated with 750 kg/h of reaction solution being introduced this time into the reactor. The residence time in the reactor was now only about 12 min.

The residual monomer content of the product gel was found to be 0.25% by weight and the solids content 43.0% by weight. The reactor inlet temperature of the reaction solution was 23.4° C. and the reactor exit temperature of the product gel obtained was 94.8° C. Maximum product temperatures of 97–99° C. were measured in the reactor.

The gel obtained was dried, ground, sieved and surface-postcrosslinked similarly to Example 1. The application testing results are shown in Table 2. The dried polymer had a centrifuge retention capacity of 36.9 g/g and a pH of 6.1 prior to the postcrosslinking.

TABLE 1

Runs with and without heat removal by reactor wall cooling

| Ex. | Cooling water temperature [° C.] | $\Delta H_K$ | $\Delta H_V$ | $\Delta H_P$ | Residual monomer acrylic acid in gel [% by weight] | CRC*) [g/g] | AUL 0.7 psi*) [g/g] |
|---|---|---|---|---|---|---|---|
| 1 | 40 | 62% | 0% | 38% | 1.23 | 32.2 | 26.0 |
| 2 | 90 | 0% | 36% | 64% | 0.25 | 33.7 | 25.6 |

*)these data relate to the postcrosslinked end product of the reported examples
$\Delta H_K$: heat of reaction removal through the cooling jacket of the reactor
$\Delta H_V$: heat of reaction removal through water evaporation from product gel
$\Delta H_P$: heat of reaction removal through discharge of hot product gel The total "heat of reaction" is deemed to be the sum total of the actual heat of polymerization and of the heat introduced into the product through mechanical stirring.

TABLE 2

Runs without heat removal by reactor wall cooling with varied reactant throughput

| Ex. | Through-put of reactant | $\Delta H_K$ | $\Delta H_V$ | $\Delta H_P$ | Residual monomer acrylic acid in gel [% by weight] | Product gel exit temperature [° C.] | CRC*) [g/g] | AUL 0.7 psi*) [g/g] |
|---|---|---|---|---|---|---|---|---|
| 3 | 450 | 0% | 40% | 60% | 0.15 | 91.7 | 34.1 | 24.8 |
| 4 | 600 | 0% | 37% | 63% | 0.30 | 93.2 | 33.7 | 24.8 |
| 5 | 750 | 0% | 35% | 65% | 0.25 | 94.8 | 32.7 | 25.8 |

*)these data relate to the postcrosslinked end product of the reported examples
$\Delta H_K$: heat of reaction removal through the cooling jacket of the reactor
$\Delta H_V$: heat of reaction removal through water evaporation from product gel
$\Delta H_P$: heat of reaction removal through discharge of hot product gel The cooling water temperature in all runs was 90° C. and the reactant inlet temperature was 22–24° C.

The total "heat of reaction" is deemed to be the sum total of the actual heat of polymerization and of the heat introduced into the product through mechanical stirring.

We claim:

1. A process comprising
   copolymerizing a monomer mixture comprising
   a) one or more water-soluble monoethylenically unsaturated monomers,
   b) from 0.001 to 5 mol % based on the monomers (a) of one or more monomers containing at least two ethylenically unsaturated double bonds, and
   c) from 0 to 20 mol % based on the monomers (a) of one or more water-insoluble monoethylenically unsaturated monomers in the presence of an initiator at from 0 to 140° C.,
   wherein the total amount of monomers a), b) and c) are present as a 20 to 80% by weight solution in water,
   wherein a mixture comprising the aqueous solution of the monomers and the initiator, and an inert gas are continuously fed into a mixing kneader having at least two axially parallel rotating shafts having a plurality of kneading and transporting elements, and conveyed from an upstream end of the mixing kneader in the axial direction toward a downstream end of the mixer,
   wherein not less than 5% of the heat of reaction is removed by evaporation of water and not less than 25% of the heat of reaction is removed by discharge of the copolymerized mixture from the mixing kneader and the remainder of the heat of reaction is removed by cooling of the mixing kneader,
   to continuously form crosslinked fine particles of a polymer gel.

2. The process as claimed in claim 1, wherein not less than 50% of the heat of reaction is removed by discharge of the copolymerized mixture and water evaporation.

3. The process as claimed in claim 1, wherein the mass throughput in terms of the aqueous monomer solution is not less than 1000 kg/hm³ and the inert gas flow is not less than 100 l/hm³.

4. The process as claimed in claim 1, wherein the monomers a) are selected from the group consisting of acrylic acid, methacrylic acid, alkali metal salts thereof, ammonium salts thereof, acrylamide and methacrylamide.

5. The process as claimed in claim 1, wherein the mixing kneader volume is not less than 0.10 m³.

6. The process as claimed in claim 1, wherein the shafts of the mixing kneader counterrotate.

7. The process as claimed in claim 1, wherein the maximum temperature in the mixing kneader is not less than 70° C., an exit gas temperature is not less than 60° C. and the temperature of the copolymerized mixture at a point of discharge from the mixing kneader is not less than 60° C.

8. The process as claimed in claim 1, wherein the inert gas is nitrogen, a noble gas, carbon monoxide, carbon dioxide, sulfur hexafluoride or a mixture thereof.

9. The process as claimed in claim 1, wherein the inert gas is wholly or partly generated by a chemical reaction in the mixing kneader.

10. The process as claimed in claim 1, wherein the monomers b) containing at least two ethylenically unsaturated double bonds are present in an amount of from 0.005 to 0.5 mol %.

11. The process as claimed in claim 1, wherein the monomers (a), (b) and (c) are present in a total amount of from 20 to 50% by weight in the aqueous solution.

12. The process as claimed in claim 1, wherein the monomers (a), (b) and (c) are present in a total amount of 30 to 45% by weight of the aqueous solution.

13. The process as claimed in claim 1, wherein the initiator is at least one selected from the group consisting of hydrogen peroxide, sodium peroxydisulfate and ascorbic acid.

14. The process as claimed in claim 1, further comprising freeing the aqueous solution of residual oxygen by contacting the aqueous solution with an inert gas.

15. The process as claimed in claim 1, wherein the copolymerizing is carried out at a temperature of from 40 to 120° C.

16. The process as claimed in claim 1, wherein the maximum temperature of the aqueous solution is not less than 90° C.

17. The process as claimed in claim 1, wherein not less than 90% of the heat of reaction is removed by discharge of the copolymerized mixture after water evaporation.

18. The process as claimed in claim 1, wherein the crosslinked fine particles of polymer gel have a water content of 40 to 70% by weight.

19. The process as claimed in claim 1, wherein the fraction of the heat of reaction removed by discharge of the copolymerized mixture is not less than 55%.

20. The process as claimed in claim 1, further comprising drying the polymer gel.

* * * * *